United States Patent Office 3,677,957
Patented July 18, 1972

3,677,957
CHEMILUMINESCENT REACTION OF CHLORINATED ETHYLENE CARBONATE WITH HYDROGEN PEROXIDE IN THE PRESENCE OF A FLUORESCER
Donald Roy Maulding, Stamford, Conn., assignor to American Cyanamid Company, Stamford, Conn.
No Drawing. Filed Dec. 17, 1969, Ser. No. 886,042
Int. Cl. C09k 3/00
U.S. Cl. 252—188.3                                6 Claims

ABSTRACT OF THE DISCLOSURE

Disclosed is a chemiluminescent composition for reaction with a peroxide compound to produce chemiluminescent light, said composition containing a halogenated ethylene carbonate and an organic fluorescent compound in an organic solvent.

---

The present invention relates to novel compositions of matter and to reactions for the direct generation of light from chemical energy employing such compositions. By "light" as referred to herein is meant electromagnetic radiation at wavelengths falling between about 350 m$\mu$ and 1000 m$\mu$.

The art of generating light from chemical energy, i.e., chemiluminescence, is continually in search of compositions which when reacted substantially improve the intensity and lifetime of light emission as contrasted to known chemiluminescent compositions and reactions. Obviously, improved compositions are constantly in demand for use as signal devices, for area illumination, etc.

Various compounds have been known and proposed in the past for obtaining chemiluminescent light. One group is based on the compound tetra-methylaminoethylene, reactive with oxygen. Such compounds must obviously be protected from air during storage.

Another group of compounds are derivatives of bis-aryl or heterocyclic derivatives of oxalic acid. These compounds react with a peroxide in the presence of a solvent and a fluorescent compound to give chemiluminescent light. Although these oxalates are the best known chemiluminescent systems, they have the disadvantage that the oxalates are relatively expensive to prepare and are also relatively insoluble, thus limiting the amount of light obtainable from a given volume of solution.

It is an object of this invention to obtain a chemiluminescent composition and a process employing said composition whereby a high efficiency may be obtained in the conversion of chemical energy into light.

Another object is to obtain a chemiluminescent compound which produces light over an extended period of time.

Another object of this invention is to obtain a chemiluminescent composition which attains light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means "reacting" or sufficiently bringing together component reactants to obtain a chemiluminescent reaction.

The term "hydroperoxide compound" as used herein is limited to peroxide compounds having at least one "HOO—" group, or a compound which upon reaction produces a compound with such a group.

The term "peroxidic groups," as used herein, represents

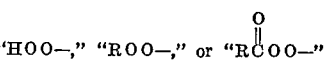

"HOO—," "ROO—," or "RĊOO—"

where R is an organic substituent, such as alkyl, cycloalkyl, α-hydroxyalkyl, substituted alkyl, for example.

The term "diluent," as used herein, means a solvent or a vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

I have now found a new class of compounds which react with a peroxide in the presence of a solvent and a fluorescer to give chemiluminescent light.

These compounds are ethylene carbonates having the general structural formula:

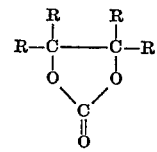

where R is halo-, i.e., fluorine, chlorine, or bromine; hydrogen and alkyl, provided that at least two of the R substituents are halo-.

Light emission is obtained by the reaction of chlorinated ethylene carbonate with hydrogen peroxide in the presence of a fluorescer. The light intensity is increased substantially with increased substitution of chloro groups, and indeed, the light intensity and efficiency is greatest when tetrachloroethylene carbonate is used. Diethyl carbonate (DEC), ethyl benzoate (EB) and o-dichlorobenzene (DCB) can be used as solvents with t-butyl alcohol or 3-methyl-3-pentanol as cosolvents. A two phase system (3 parts/one part by volume) of DEC, EB, or DCB with 30% hydrogen peroxide provides a superior chemiluminescent system. With such fluorescers as 9,10-diphenylanthracene, perylene, 9,10-bis(phenylethynyl)anthracene and 5,12-bis(phenylethynyl)naphthacene, blue to red emission is produced.

The hydroperoxide employed in the compositions and process of this invention may be obtained from any suitable peroxide compound. For example, the hydroperoxide may be employed as sodium peroxide. Alternatively, sodium perborate may be placed in aqueous solution whereby a solution of hydrogen peroxide is obtained. Obviously, hydrogen peroxide or its solution may be employed. The peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), sodium perborate, and the like. Still another form in which the $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Alternatively, the hydroperoxide employed in the composition or process could be any compound having a hydroperoxidic group, such as a hydroperoxide (ROOH) or a peroxy acid

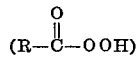

such as t-butyl hydroperoxide and perbenzoic acid. Whenever hydrogen peroxide is contemplated to be employed, any suitable compound may be substituted which will produce hydrogen peroxide.

The hydroperoxide concentration may range from about 15 molar down to about $10^{-5}$, preferably about 2 molar down to about $10^{-4}$ molar. The chlorinated ethylene carbonate of this invention may be added as a solid or in admixture with a suitable solid peroxide reactant or in a suitable diluent, or alternatively dissolved directly in a solution containing the peroxide reactant.

Broadly, diluents within the purview of the instant discovery are those that do not readily react with a peroxide such as hydrogen peroxide, and which do not readily react with the ethylene carbonates.

Although the addition of water is not necessary for the production of chemiluminescent light in certain embodiments according to the present invention, water can serve as the diluent or partial diluent. The term "water," as used herein, includes water-producing compounds such as hydrates. In addition, however, either one or more diluents may be included with or in the place of the water, as long as the peroxide employed is at least partially soluble in the diluent(s), such as, for example, at least one gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chloro, bromo, cyano, alkoxy ($C_1$-$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescene," by Peter Pringsheim, Interscience Publishers, Inc., New York, N.Y., 1949. Other fluorescers are described in "The Colour Index," second edition, vol. 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release.

It has been found that molar (moles per liter of diluent) concentrations of the major components of the novel composition herein described may vary considerably. It is only necessary that components be in sufficient concentration to obtain chemiluminescence. The ethylene carbonate molar concentration normally is in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$; and the water or other diluent must be present in a sufficient amount to form at least a partial solution of the reactants involved in the chemiluminescent reaction. There is no known maximum limit on the concentration of ethylene carbonate employed in the reaction. The ester may serve as either the sole diluent or a partial diluent.

The ingredients of the composition of this invention, may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes an ethylene carbonate and a fluorescent compound but which does not includes a peroxide compound. Another alternative composition would be a composition which includes the fluorescent compound and a peroxide, but which does not include the ethylene carbonate. Another alternative composition would be a solid composition which includes a solid ethylene carbonate and a solid hydroperoxide compound, and possibly additionally includes a solid fluorescent compound, but which does not include a diluent. Obviously the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the least component necessary to bring about the chemical reaction and the concurrent release of chemical energy.

Additionally, it has been found that the superior intensity of chemiluminescence is obtained when the final mixture producing the luminescence is maintained at a temperature of between about $-40°$ C. and $75°$ C., preferably between about $20°$ C. and $50°$ C.; however, the luminescence of applicant's process is not limited to these ranges. However, temperature is not critical.

Additionally, the composition and the process which obtains preferred optimum chemiluminescent light intensity employs a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being: sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; etc.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

The following examples are intended to illustrate the present invention and are in no way intended to limit the invention except as limited in the appended claims.

moved and vacuum distillation of the oil isolated gave 134 g. of tetrachloroethylene carbonate, B.P. 34°/3.4 mm. (lit.[8] B.P. 46°/approx. 5 mm.); infrared, 1875 and 1775 cm.$^{-1}$ (Nujol) and 92.1 g. of a second fraction, B.P. 51–65°/3.2 mm. Attempted distillation of the second fraction at 50 mm. caused decomposition.

*Analysis.*—Calcd. for $C_3ClO_3$ (percent): C, 15.93; Cl, 62.83. Found (percent): C, 15.85; Cl, 62.79.

EXAMPLE II

In this experiment, chlorination of 88 g. of ethylene carbonate in 200 ml. of carbon tetrachloride for 6 hours gave 8.8 g. of monochloroethylene carbonate, B.P. 108–110°/20 mm. and 13.6 g. of dichloroethylene carbonate, B.P. 70–72°/20 mm. Peaks at 3.69$\tau$ and 5.04$\tau$ in the NMR spectrum of the first fraction indicated a mixture of 1,2-dichloroethylene carbonate (8 parts) and 1,1-dichloroethylene carbonate (1 part).

*Analysis.*—Calcd. for $C_3H_3ClO_3$ (percent): C, 29.37; H, 2.45; Cl, 28.98. Found (percent): C, 29.50; H, 2.54; Cl, 29.17.

*Analysis.*—Calcd. for $C_3H_2Cl_2O_3$ (percent): C, 22.93; H, 1.28; Cl, 45.23. Found (percent): C, 22.97; H, 1.27; Cl, 45.30

EXAMPLES III TO VIII

In these examples, the chemiluminescence of a system using tetrachloroethylene carbonate with a homogeneous solvent system, using different organic solvents and varying concentrations, was evaluated. The results are shown in Table I.

TABLE I.—QUANTITATIVE TETRACHLOROETHYLENE CARBONATE (TCEC) CHEMILUMINESCENCE

Homogeneous Reactions[a]

| Example | TCEC[b] solvent | TCEC, conc. (M) | $H_2O_2$ (conc. M) | Quantum yield ($10^2$ ein. mole$^{-1}$) | Lt. cap. (lm. hr. liter$^{-1}$) | Lifetime[c] ($T_{3/4}$ [min.]) | $I_{max.}$, ft. lbt. cm.$^{-1}$ |
|---|---|---|---|---|---|---|---|
| III | DCB | 0.036 | [d] 0.09 | 0.96 | 10.67 | 8.42 | 12.47 |
| IV | EB | 0.03 | 0.07 | 0.98 | 9.13 | 8.39 | 9.22 |
| V | EB | 0.03 | 0.03 | 0.85 | 7.88 | 16.57 | 3.68 |
| VI | EB | 0.10 | 0.23 |  |  | 4.0 | 12.50 |
| VII | EB | 0.10 | 0.023 | 0.33 | 10.18 | 12.64 | 9.56 |
| VIII | EB | 0.10 | 0.07 | 0.33 | 10.13 | 4.30 | 19.52 |

[a] Reactions with 0.003 M 9,10-bis(phenylethynyl)anthracene (BPEA) in 75% (vol.) indicated solvent and 25% t-butyl alcohol except note d at 25° C.
[b] DCB=o-dichlorobenzene; EB=ethyl benzoate.
[c] Time required for three-quarters of total light emission.
[d] 10% t-butyl alcohol by volume and 90% dichlorobenzene.

EXAMPLE I

Tetrachloroethylene carbonate.—A solution of 100 g. of ethylene carbonate in 250 ml. of carbon tetrachloride while under reflux and while being irradiated with a GE BH–6 lamp (Pyrex filter) was treated with chlorine for 15 hours. The reaction was considered complete when a yellow color remained upon irradiation, after stopping the flow of chlorine for 30 minutes. The solvent was re-

EXAMPLES IX TO XIII

In these examples, the chemiluminescent properties of tetrachloroethylene carbonate were evaluated in a heterogeneous solvent system. For this purpose, the hydrogen peroxide was used as an aqueous solution. The results are shown in Table II.

TABLE II.—QUANTITATIVE TETRACHLOROETHYLENE CARBONATE (TCEC) CHEMILUMINESCENCE

Heterogeneous Reactions[a]

| Example | TCEC, solvent[b] | TCEC, conc. (M) | Quantum yield ($10^2$ ein. mole$^{-1}$) | Lt. cap. (lm. hr. liter$^{-1}$) | Lifetime[c] [$T_{3/4}$ (min.)] | $I_{max.}$ ft. lbt. cm.$^{-1}$ |
|---|---|---|---|---|---|---|
| IX | EB | 0.03 | 4.90 | 46.04 | 40.75 | 9.56 |
| X | DEC | 0.03 | 6.49 | 58.64 | 64.63 | 12.96 |
| XI | EB[d] | 0.10 | 2.27 | 71.24 | 45.64 | 24.09 |
| XII | EB[e] | 0.10 | 2.34 | 73.42 | 38.48 | 22.16 |
| XIII | EB | 1.0 | 0.19 | 60.06 | 10.23 | 67.59 |

[a] Reaction of three parts TCEC solution by volume with one part 30% aqueous $H_2O_2$.
[b] EB=ethyl benzoate; DEC=diethyl carbonate.
[c] Time required for emission of three-fourths total light.
[d] Additional BPEA was added after 35 and 100 minutes. Intensity of light before addition was zero.
[e] Additional BPEA was added after 10, 30, and 70 minutes, so that a smooth light intensity vs. time decay curve was maintained.

I claim:
1. A chemiluminescent composition for reaction with a peroxide compound to produce chemiluminescent light, said composition containing the ingredients an ethylene carbonate compound of the formula:

$$R-\underset{\underset{O}{|}}{\overset{\overset{R}{|}}{C}}-\underset{\underset{O}{|}}{\overset{\overset{R}{|}}{C}}-R$$
$$\underset{O}{\overset{\diagdown\;\diagup}{C}}$$
$$\|$$
$$O$$

wherein R represents a substituent selected from the groups consisting of halo-, and said halo- being selected from the groups consisting of chloro-, bromo- and fluoro-; alkyl; and hydrogen, at least two of said R substituents being halo-, and an organic fluorescent compound having a spectral emission between about 300 and 1000 angstroms, and an organic solvent for said ethylene carbonate compound and fluorescent compound, said ethylene carbonate concentration in said solvent being in the range of $10^{-7}$ to 5 molar and the ratio of ingredients being such as to obtain chemiluminescent light when reacted with said peroxide.

2. The composition of claim 1 wherein said halo- is chloro-.
3. The composition of claim 1 wherein said peroxide is hydrogen peroxide.
4. The composition of claim 1 wherein said fluorescent compound is 9,10-bis(phenylethynyl)anthracene.
5. The composition of claim 1 wherein said solvent is a mixture of organic solvents.
6. The composition of claim 1 wherein said hydrogen peroxide is in the form of an aqueous solution.

References Cited

UNITED STATES PATENTS 3,020,290   2/1962   Moss _____ 260—340.2

JOHN D. WELSH, Primary Examiner

U.S. Cl. X.R.

252—186; 260—340.2